United States Patent [19]

Eales

[11] Patent Number: 5,066,502
[45] Date of Patent: Nov. 19, 1991

[54] CONFECTION AND SAFETY SUPPORT HANDLE

[76] Inventor: George E. Eales, 527 West Olive Ave., Redlands, Calif. 92373

[21] Appl. No.: 521,320

[22] Filed: May 8, 1990

Related U.S. Application Data

[63] Continuation-in-part of Ser. No. 282,946, Dec. 5, 1988, abandoned, which is a continuation-in-part of Ser. No. 48,570, May 11, 1987, abandoned.

[51] Int. Cl.$^5$ .............................................. A23G 3/00
[52] U.S. Cl. ...................................... 426/75; 426/91; 426/134; 426/104; 426/103
[58] Field of Search ................ 426/134, 421, 515, 91, 426/75, 103, 104; 249/55, 92-97; 424/440

[56] References Cited

U.S. PATENT DOCUMENTS

| D. 232,330 | 8/1974 | Cappadoya | 426/134 |
|---|---|---|---|
| 1,502,006 | 7/1924 | Alvord | 426/134 |
| 1,548,970 | 8/1925 | York | 426/134 |
| 1,593,858 | 7/1926 | Venable | 426/134 |
| 1,623,926 | 4/1927 | Kohler | 426/134 |
| 1,718,997 | 7/1929 | Burt . | |
| 1,737,919 | 12/1929 | Crain . | |
| 1,778,485 | 10/1930 | Davidson . | |
| 1,847,415 | 3/1932 | Snell | 426/134 |
| 1,915,614 | 6/1933 | Parker . | |
| 1,929,906 | 10/1933 | Shokowski . | |
| 1,952,688 | 3/1934 | Schnaier | 426/134 |
| 1,971,560 | 8/1934 | Guyon . | |
| 1,972,799 | 9/1934 | Schnaier . | |
| 1,980,588 | 11/1934 | Hopp . | |
| 2,003,612 | 6/1935 | Schnaier | 426/134 |
| 2,036,706 | 4/1936 | Law . | |
| 2,046,415 | 7/1936 | Sackner | 426/421 |
| 2,085,330 | 6/1937 | Price | 426/134 |
| 2,096,611 | 10/1937 | Ellestad . | |
| 2,116,310 | 5/1938 | Harvey . | |
| 2,131,727 | 10/1938 | Davis . | |
| 2,151,282 | 3/1939 | Stamp | 426/134 |
| 2,166,568 | 7/1939 | Kuhlke . | |
| 2,243,375 | 5/1941 | Ellestad . | |
| 2,246,778 | 6/1941 | Cahoon . | |
| 2,469,589 | 5/1949 | Barricini . | |
| 2,614,047 | 10/1952 | Turner . | |
| 2,682,234 | 6/1954 | Baldanza | 249/92 |

(List continued on next page.)

FOREIGN PATENT DOCUMENTS

| 2823320 | 12/1979 | Fed. Rep. of Germany | 426/134 |
|---|---|---|---|
| 309970 | 7/1933 | Italy | 426/134 |
| 60-14124 | 7/1985 | Japan . | |
| 60-133841 | 7/1985 | Japan | 426/134 |
| 61-128840 | 6/1986 | Japan | 426/515 |
| 62-36151 | 2/1987 | Japan | 426/87 |
| 62-220150 | 9/1987 | Japan | 426/104 |
| 1-256372 | 10/1989 | Japan | 426/134 |
| 424192 | 2/1935 | United Kingdom | 426/134 |
| 2075327 | 11/1981 | United Kingdom | 426/134 |

OTHER PUBLICATIONS

J of Georgia, Florida Soc. of Pharmacists, vol. 1, #4, Spring '52, p. 18.

*Primary Examiner*—Steven Weinstein
*Attorney, Agent, or Firm*—Sheldon & Mak

[57] ABSTRACT

A sucker is disclosed in which the edible portion cannot be separated from the stick. A support member for the edible is formed from a semi-rigid plastic material, including a loop-shaped handle portion, a body portion for the edible, and a coupling for fixably connecting the handle portion to the body portion. The body portion can be shaped for modeling a prototype such as a cartoon character or a vehicle. The body portion can be loop-shaped for enhancing the security of the edible, and the loop configuration can also simulate the object. The body and handle portions are formed with a lobed cross-sectional shape simulative of a rope for enhancing support of the edible material, and for a desired combination of strength, flexibility, and ease of gripping the handle portion. The edible material can include a first edible layer shaped for simulating a prototype object, and a second edible layer that is at least semi-transparent for permitting view of the first edible layer. A second loop-shaped handle portion can extend oppositely form the first for preventing full entry of the edible into the consumer's mouth.

25 Claims, 3 Drawing Sheets

U.S. PATENT DOCUMENTS

| | | | |
|---|---|---|---|
| 2,784,684 | 3/1957 | MacLean | 426/134 |
| 2,821,481 | 1/1958 | Moslo | 426/134 |
| 2,946,207 | 7/1960 | Hulterstrum | 426/421 |
| 2,980,039 | 4/1961 | Jolly | 426/134 |
| 3,001,381 | 9/1961 | Frei | 249/93 |
| 3,062,662 | 11/1962 | McDonald | 426/134 |
| 3,140,954 | 7/1964 | Schroeder | 426/134 |
| 3,264,115 | 8/1966 | Davis . | |
| 3,423,061 | 1/1969 | Pietrzak | 249/92 |
| 3,545,980 | 12/1970 | Stanger . | |
| 3,662,693 | 5/1972 | Dana | 426/515 |
| 3,968,262 | 7/1976 | Hodska | 426/134 |
| 4,001,440 | 1/1977 | Hoyt | 426/515 |
| 4,027,044 | 5/1977 | Taylor . | |
| 4,027,047 | 5/1977 | Harima | 426/134 |
| 4,165,061 | 8/1979 | Kupperman | 426/515 |
| 4,452,825 | 6/1984 | Klacik et al. . | |
| 4,478,386 | 10/1984 | Mikkelsen | 426/134 |
| 4,548,573 | 10/1985 | Waldstrom | 426/515 |
| 4,551,329 | 11/1985 | Harris . | |
| 4,671,953 | 6/1987 | Stanley et al. | 424/440 |
| 4,847,090 | 7/1989 | Dellaposta et al. | 424/440 |
| 4,902,519 | 2/1990 | Ream et al. | 426/134 |

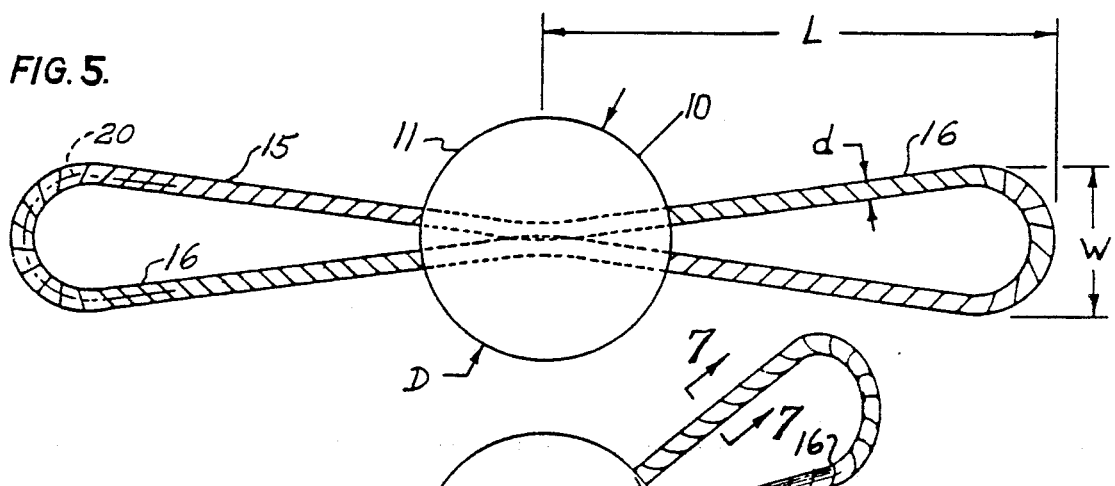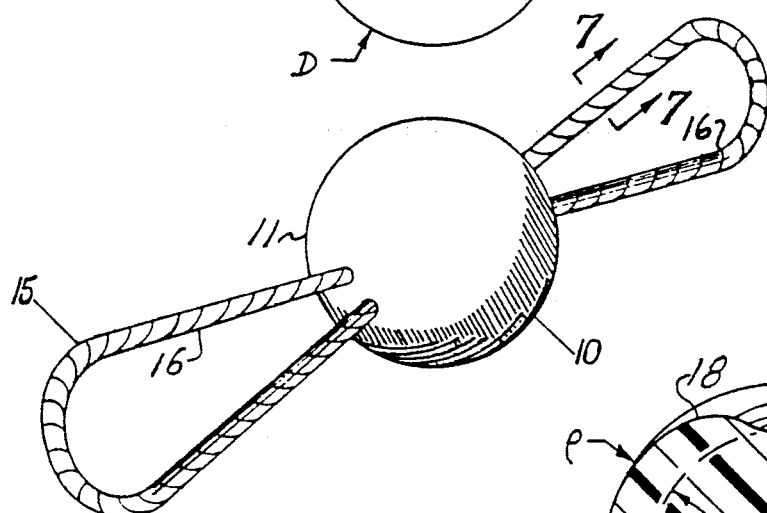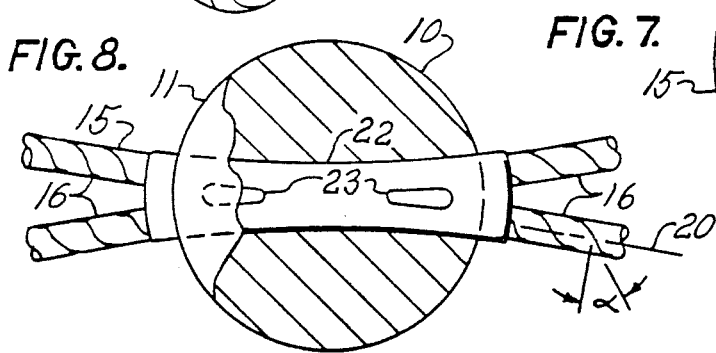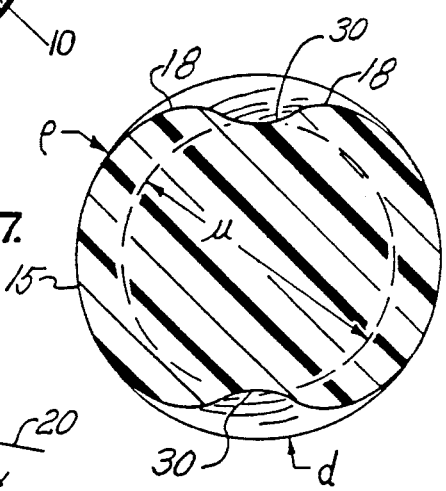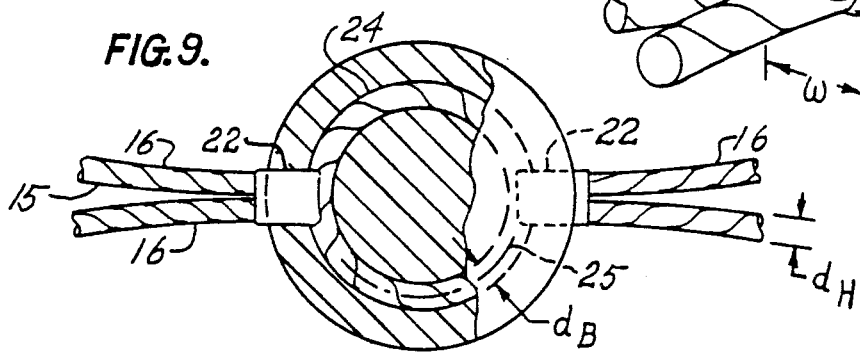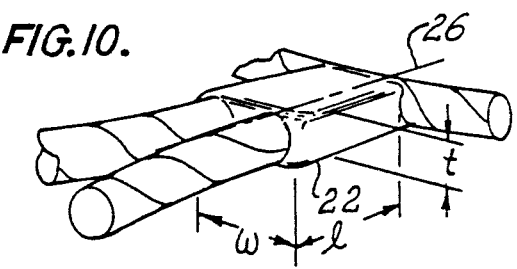

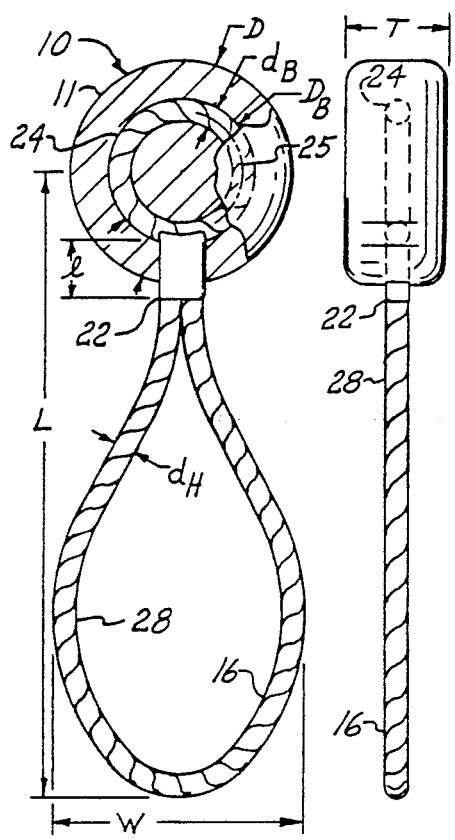
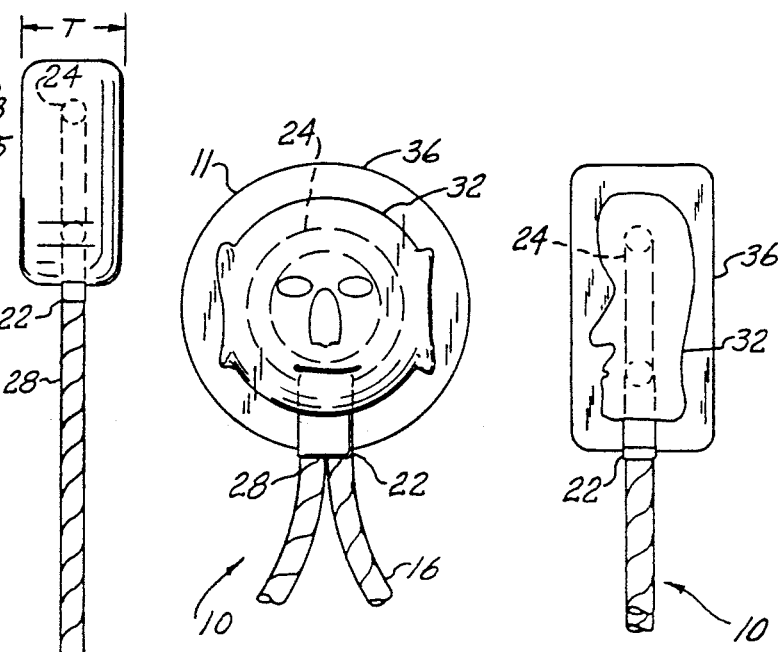
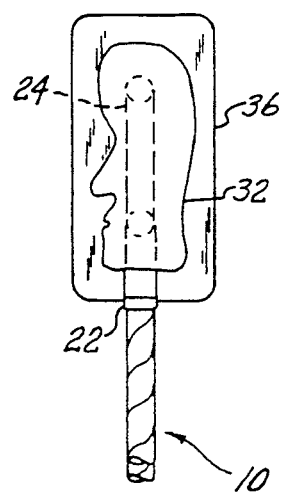
FIG.11  FIG.12  FIG.13  FIG.14
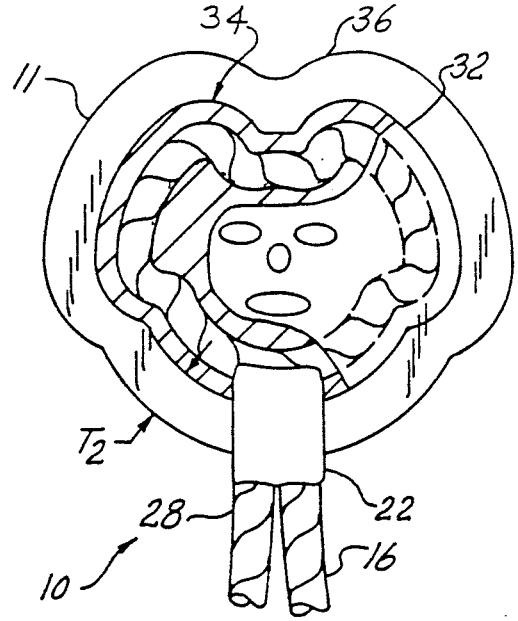
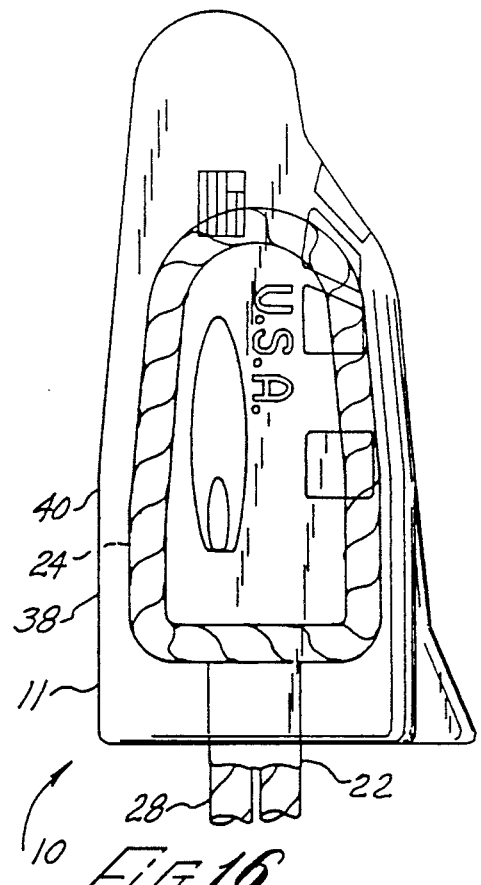
FIG.15  FIG.16

CONFECTION AND SAFETY SUPPORT HANDLE

RELATED APPLICATIONS

This application is a continuation-in-part of application Ser. No. 282,946, filed on Dec. 5, 1988, which is a continuation-in-part of application Ser. No. 048,570, filed on May 11, 1987, and now abandoned, each being incorporated herein by this reference.

BACKGROUND

The present invention relates generally to candy suckers (lollipops) and a class of throat-soothing edibles, which includes cough or throat drops, hard candy and the like.

The issue of safety is prominent in the prior art field of "edibles on a stick" as it applies to candy suckers. In particular, concern has been expressed about the potential danger to a baby or to a younger child who might fall while in the process of consuming candy on a conventional "candy-sucker" stick, e.g., serious injury can result if the stick were to be jammed into the child's mouth as a result of the fall; or if either the edible or the stick were to be shoved down the child's throat; or the edible comes off the stick and the child chokes on the edible. Further, this concern is expressed every time that a mother calls out while her young child is going out the door, "Don't run with the lollipop in your mouth."

This problem is clearly enunciated in U.S. Pat. No. 1,915,614 to Parker. While discussing the dangers of a conventional candy lollipop with a wooden handle, Parker states:

"Frequently such edibles are carried in the mouth of the consumer while eating, the handle projecting several inches outside of the mouth, and providing the means of a severe wound in the event that the handle is struck as by the consumer falling while the lollipop is being eaten. The consumer of a lollipop having a wooden handle is, therefore, endangered because the handle may pierce the flesh of the consumer when it is so struck or the handle may be broken and splintered and slivers therefrom may pierce or inflict a severe wound in the mouth or about the features of one eating the lollipop."

A review of the candy sucker/lollipop prior art discloses that these dangers have been well-recognized. However, while the problems are inherent in the basic candy sucker structure where the edible overlaps the end of the stick, the narrowest and most dangerous part; and its method of consumption wherein the consumer places both the edible and the stick in his mouth while eating the edible; the prior art solutions have been directed primarily towards the composition of the stick, particularly those made of wood.

Yet, even in terms of such wooden replacements as rubber, twisted paper, cord, cellophane and other cellulosic sheet materials, serious problems remain. For example, Parker discloses a stick made of seagrass which provides a strong or flexible cord or rope-like member. This one looped handle flexible stick alleviates inherent dangers of a conventional candy sucker wooden stick. However, the consumer (usually a younger child) is not protected from the inherent dangers of the edible as it is being eaten while in the consumer's mouth. Therefore, there is nothing to prevent an edible from choking a child should it become separated from the looped handle and get stuck in the child's throat. Moreover, the severity of this problem depends on the size to which the edible is reduced at the time of separation and swallowing. For example, the edible may at a given time be small enough to enter the mouth, yet too large to enter the throat. Then the edible, after being further eaten, may become small enough to enter the throat, yet large enough to cause choking.

U.S. Pat. No. 2,246,778 to Cahoon discloses stick embedded in a confection, the stick having a weakened portion exterior to the confection that will break off in case of an accident. However, this does not eliminate the inherent dangers in either the confection or the stick. First, since the separation of the stick from the confection is predicated on the application of a certain amount of force, accidents below that force threshold would not be affected, i.e., the stick would not be separated from the confection. Second, even if the stick were to be separated from the confection, this does not guarantee that a child would not be injured by either of the separated parts.

U.S. Pat. No. 2,469,589 to Barricini discloses a stick composed of polyethylene to provide a flexible support for an eatable. Barricini points out that previously used replacements for wood can alter the taste of the eatable member, and are subject to the migration of chemicals into the eatable member. They are also subject to deterioration and brittlization, with broken off fragments being harmfully consumed by the child. The polyethylene would provide "the necessary toughness to anchor the candy to the stick to prevent the user from choking on the complete mass of candy." As disclosed in the specification, drawings, and claims of Barricini, the stick is embedded and secured in the eatable, thereby terminating within the eatable itself. However, the stick anchor portion of Barricini is further disclosed as being shaped like a winged horse, having a number of relatively large, sharp protrusions (head, wings, feet, etc.). These protrusions, which apparently serve to strengthen the connection between the stick and the eatable, are undesirable in that they would aggravate the risk of injury to the mouth or throat of the consumer, especially in an accident. Because the horse is thin and flexible, the eatable would tend to break away from the horse in sharp, jagged pieces when the user bites down on the eatable which could cause the user to choke. The horse or other flattened object which serves as the anchor portion of the handle takes up a significant portion of the thickness of the eatable, considerably reducing the thickness of the eatable member whereby the surface of the eatable on each side of the anchor portion would be consumed firstly, leaving the anchor exposed. The anchor portion is thus no longer completely embedded in the eatable, such that large portions of the remaining eatable can be broken away, especially when the anchor portion flexes.

Thus it is believed that many of these safety problems are inherent in the basic candy sucker structure (wherein the edible overlaps the end of the stick); and the associated method of consuming a candy sucker edible (wherein both the edible and the stick are placed in the mouth concurrently); rather than the composition of the stick, as has been indicated in the prior art.

Thus there is a need for a sucker that may be safely eaten without risk of separation of a large mass of the edible from the stick, without risk of premature swallowing of the edible, that is attractive in appearance and easy to hold while it is being eaten, and is inexpensive to produce.

SUMMARY

The present invention meets this need by providing a sucker in which the edible portion cannot be separated from the stick. The sucker includes a support member formed from a semi-rigid plastic material and having a support body portion, a loop-shaped handle portion, and means for fixably connecting the handle portion to the body portion; and an edible material covering the body portion. The body portion can be shaped for modeling a prototype object which can be a cartoon character or a vehicle. The body portion can be loop-shaped, having an approximately uniform cross-section along a curved body axis. The body axis can be shaped for modeling a prototype object. Preferably, the body portion is formed with a non-circular cross-sectional shape having at least one lobe forming a helical pattern simulative of a rope along the body axis for enhancing support of the edible material on the body portion. The body portion can be formed with a pair of the lobes which are symmetrically spaced about the body axis and having a helix angle of approximately 45°.

Preferably, the means for connecting the handle portion to the body portion includes a coupling portion of the support member for spacing the handle portion from the support body portion by a distance substantially equal to a corresponding thickness of the edible material. The coupling portion can have a coupling axis extending between the support body portion and the handle portion and a substantially uniform cross-section along the coupling axis. Preferably the coupling portion is substantially rectangular in cross-section, having a thickness approximately equal to a corresponding cross-sectional thickness of the handle portion, and a width at least approximately double the thickness for supportively connecting adjacent end portions of the handle portion.

The edible material can include a first edible layer shaped for simulating a prototype object, and a second edible layer that is at least semi-transparent for permitting view of the first edible layer. The second edible layer can have an approximately uniform thickness in at least one viewing plane for forming an enlarged counterpart of the simulated prototype object. The thickness of the second edible layer in the viewing plane can be at least approximately 10 percent of the corresponding thickness of the first edible layer. The thickness of the second edible layer can be substantially uniform in at least two intersecting planes. The second edible layer can be molded onto the first edible layer, the shape of the second edible layer being independent of the shape of the first edible layer. Also, the second edible layer preferably encloses the first edible layer.

Preferably, the handle portion is formed with a uniform cross-sectional shape having at least one lobe forming a helical pattern simulative of a rope along the handle axis for imparting flexibility to the handle portion and for enhancing support of the handle portion by the hand of an eater of the edible material. The handle portion can be formed with a pair of the lobes which are symmetrically spaced about a loop-shaped longitudinal handle axis of the handle portion and have a helix angle of approximately 45°. The support member can include material selected from the group consisting of polyethylene, polypropylene, and Nylon, and the handle portion can include a major cross-sectional diameter of between approximately 0.125 inch and approximately 0.2 inch. The cross-sectional diameter can be between approximately 0.15 inch and 0.19 inch.

The handle portion can be a first handle portion, the support member also forming a second loop-shaped handle portion, the second handle portion, and means for fixably connecting the second handle portion to the body portion, the handle portions extending from opposite sides of the body portion for preventing swallowing of the edible in an undissolved condition. Thus the handle cannot be bitten apart, bitten on, or separated from the edible portion, preventing swallowing of the edible. Neither can the handle be stuck in an ear, eye, nose, etc. of a consumer.

In another configuration of the present invention, a sucker includes a support formed from a semi-rigid plastic material having a support body portion, a pair of handle portions, and means for fixably connecting the handle portions to the body portion; and an edible material covering the body portion, the handle portions extending from opposite sides thereof for grasping by a consumer, one handle portion in each hand of the consumer. Each of the handle portions can form a loop extending from the edible material.

DRAWINGS

These and other features, aspects, and advantages of the present invention will become better understood with reference to the following description, appended claims, and accompanying drawings where:

FIG. 5 is a plan view of an edible on a stick similar to that shown in FIG. 1, except that the support means is a stick composed of fairly resilient material which has been bent and formed to provide two symmetrical looped handles, one on each side of the edible;

FIG. 6 is an isometric projection view of the edible on a stick shown in FIG. 5;

FIG. 7 is a lateral sectional detail view of the sucker of FIG. 5 on line 7-7 of FIG. 6;

FIG. 8 is a fragmentary longitudinal sectional detail view showing an alternative configuration of the sucker of FIG. 5;

FIG. 9 is a fragmentary longitudinal sectional view showing another alternative configuration of the sucker of FIG. 8;

FIG. 10 is an oblique elevational perspective view showing a portion of the sucker of FIG. 9;

FIG. 11 is a fragmentary sectional front elevational view showing an alternative configuration of the sucker of FIG. 10;

FIG. 12 is a fragmentary sectional side elevational view of the sucker of FIG. 11;

FIG. 13 is a fragmentary sectional front elevational view showing another alternative configuration of the sucker of FIG. 9;

FIG. 14 is a fragmentary sectional side elevational view of the sucker of FIG. 13;

FIG. 15 is a fragmentary sectional front elevational view showing another alternative configuration of the sucker of FIG. 9;

FIG. 16 is a fragmentary sectional front elevational view showing another alternative configuration of the sucker of FIG. 9.

DESCRIPTION

Figure 1:
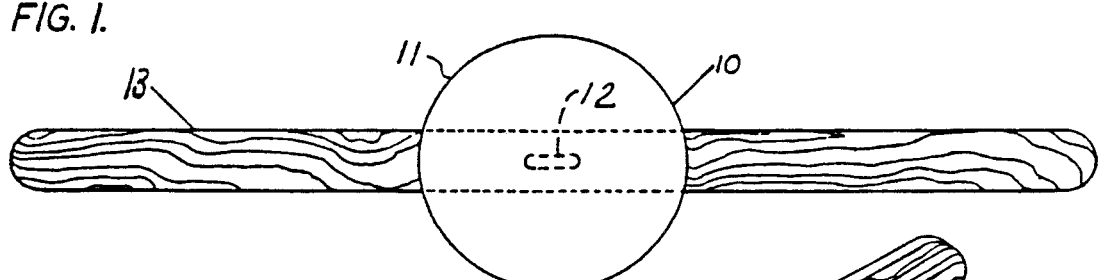
FIG. 1 is a plan view of an edible shown centrally molded at the center of a thick and sturdy flatshaped wooden stick.
Figure 2:
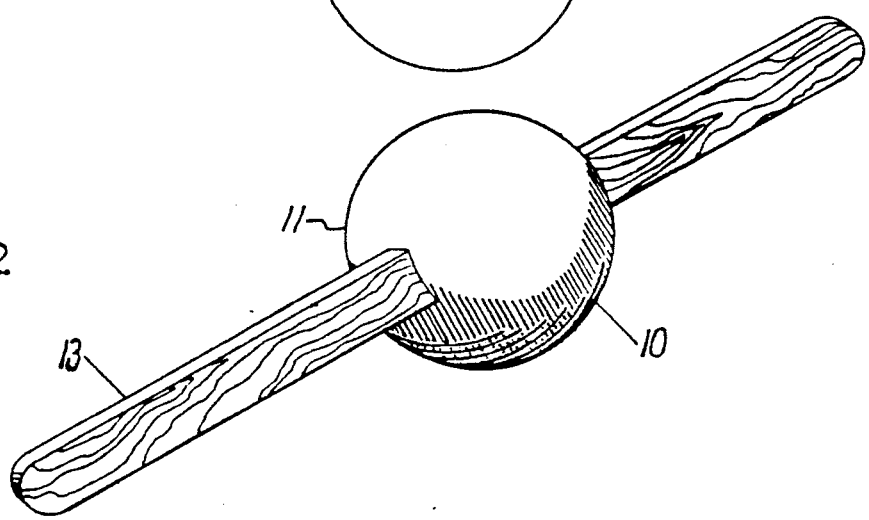
FIG. 2 is an isometric projection of the edible on a stick as shown in FIG. 1.

The present invention is directed to a sucker or lollipop having a confectionery or medicinal edible material. With reference to the drawings, FIGS. 1 and 2 show, in accordance with one embodiment of the present invention, plan and isometric views of a sucker 10 having a throat-soothing spherical-shaped solidified edible 11 securely molded at the center of a thick and sturdy flatshaped wooden stick 13.

The edible 11 is a throat-soothing edible composed of a medicinal blend of ingredients, substantially the same as that contained in cough or throat drops, tablets, and the like. Such composition of the edible 11 is particularly effective in bonding to the stick 13 when molded thereon as described below, such that the edible 11 is not subject to slipping along the stick 13, either prior to or during consumption thereof. Alternatively, the edible 11 is composed of a confectionery blend of ingredients or "hardcandy", substantially the same as that contained in hard sucker candy-type edibles. As further shown in FIG. 1, the stick 13 can be formed with a centrally located passage 12 therethrough, the edible 11 protruding the passage 12 for further securely holding the edible 11 centrally located on the stick 13.

Figure 3:
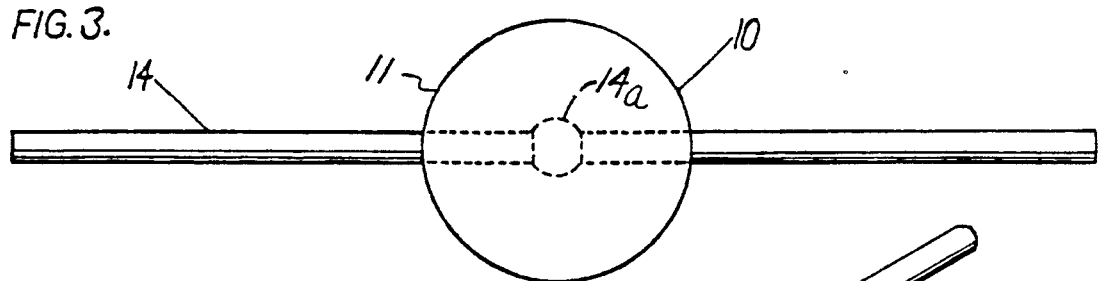
FIG. 3 is a plan view of an edible on a stick similar to that shown in FIG. 1, except that the support means is a round stick.
Figure 4:
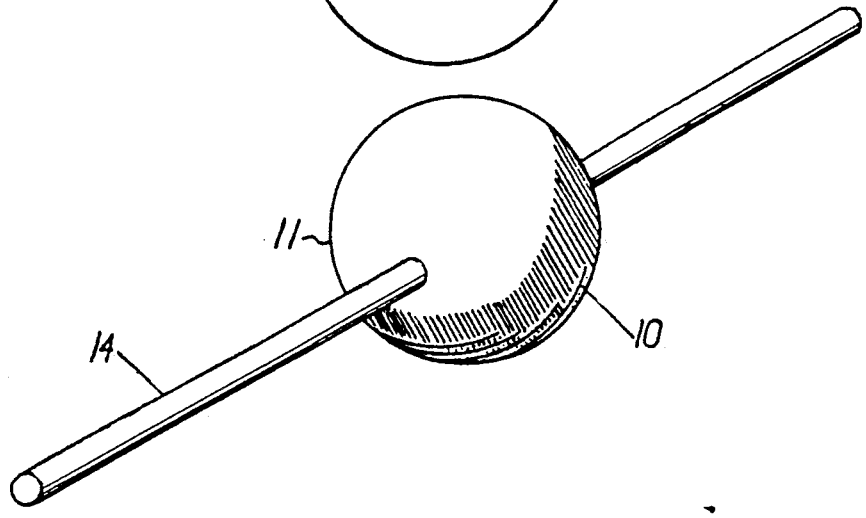
FIG. 4 is an isometric view of the edible on a stick shown in FIG. 3.

FIGS. 3 and 4 show plan and isometric views of the sucker 10 having the edible 11 securely molded at the center of a round stick 14. As further shown in FIG. 3, the stick 14 can be formed with a centrally located protrusion 14a thereon for further securely holding the edible 11 in its centrally located position on the stick 14. The stick 14, as well as the stick 13, can formed of wood or a suitable plastic as further discussed below.

FIGS. 5 and 6 show plan and isometric views of the sucker 10 having the edible 11 securely molded at the center of a stick 15 which is composed of a fairly resilient material such as spirally-twisted paper that has been bent and formed to provided two symmetrical looped handles 16, one on each side of the edible 11. More preferred, however, is the stick 15 being formed of a semi-rigid plastic such as polyethylene, polypropylene, Nylon ®, or the like, the stick 15 being formed with a solid cross-sectional shape simulative of twisted rope for enhancing the flexibility of the stick 15 while providing high tensile strength. Preferably, the stick 15 is molded as a continuous member, without splices, for maintaining full strength of the stick 15, even as the edible 11 is eaten away. As most clearly shown in FIG. 7, the stick 15 has a non-circular crosssection, being formed with one or more lobes 18, the lobes 18 having a uniform cross-sectional shape along a curved stick axis 20 that defines the loop-shaped handles 16. When there are two or more of the lobes 18 as shown in FIG. 7, the lobes 18 are symmetrically disposed about the stick axis 20. The lobes 18 are also helically shaped for simulating the strands of a rope, whereby a relatively large uniform cross-sectional area (and shape) is maintained along the handles 16, the pattern of the lobes 18 rotating about the stick axis 20 as the location of the cross-sectional pattern is moved along the stick 15. Thus the stick 15 is locally uniformly strong and flexible in all directions about the stick axis 20.

A further advantage of the lobed configuration of the stick 15 is that a relatively large surface area is presented for bonding to the edible 11, thereby enhancing the security of the centered position of the edible 11 between opposite ends of the stick 15.

With further reference to FIG. 8, a further improved configuration of the sucker 10 has the stick 15 including a coupling member 22 for joining opposite sides of the stick 15, the coupling member 22 further enhancing the structural integrity of the stick 15 and also the security of attachment of the edible 11 thereon. The coupling member 22 is preferably formed integrally with the stick 15 for maximum structural integrity and ease of manufacture. In the configuration of FIG. 8, the edible 11 is advantageously positively locked in its central location on the stick 15, being molded through a pair of lock passages 23 of the coupling 22.

With further reference to FIGS. 9 and 10, another alternative configuration of the sucker 10 has the edible 11 securely molded on a support body portion 24 of the stick 15, a pair of the couplings 22 connecting the body portion 24 to the respective looped handles 16 of the stick 15. As shown in FIG. 9, the body portion 24 is ring-shaped, having generally the same cross-sectional shape as the handles 16 along a curved body axis 25. The ring-shaped configuration of the body portion 24 advantageously provides positive locking of the edible 11 thereon, without requiring interlocking engagement of the edible 11 with either of the couplings 22. Thus the couplings 22 can have a simple cylindrical configuration for facilitating clean termination of the molded edible 11 at its surface junction with the stick 15. In this respect, the term "cylindrical" is to be understood in its general sense, indicating a surface that is generated by a straight line segment that moves parallel to a fixed axis. Accordingly, the coupling 22 is shown in FIG. 10 as having a uniform rectangular section along a coupling axis 26. The rectangular cross-sectional shape of the coupling 22 is particularly easy to provide in tooling for the stick 15, as well as in secondary tooling for molding the edible 11 thereon. It will be understood that the coupling 22 can also be formed circularly or elliptically cylindrical about the coupling axis 26.

In the configurations shown by FIGS. 5–10, the edible 11 can be molded as a spherical member having a diameter D, each handle 16 extending nominally to a length L from the center of the edible 11, the handles 16 also being formed with an overall width W. The semi-rigid material of the stick 15 permits each handle 16 to be significantly deformed from the initially molded configuration when gripped in one's hand. However, each handle 16 returns substantially to its initially molded length L and width W when it is released. The lobes 18 are smoothly contoured, a corresponding number of grooves 30 being formed therebetween, each groove 30 being formed to a depth $p$ below a major diameter $d$ of the handles 16, the grooves 30 also having a corresponding minor diameter $\mu$. The lobes 18 are formed at a helix angle $\alpha$ as shown in FIG. 8. Preferably the helix angle $\alpha$ is approximately 45° for providing a desirable combination of strength, flexibility, and ease of gripping by a consumer of the edible 11. In the configuration of FIGS. 9 and 10, the major diameter of the handles 16 is designated $d_H$, the body portion 24 also having a major cross-sectional diameter $d_B$, The major diameter $d_H$ and the major cross-sectional diameter $d_B$ are preferably approximately equal for uniform strength of the stick 15 and for ease of manufacture, the body 24 having a counterpart of the non-circular cross-sectional configuration of the handles 16 as described above. The coupling member 22 has a thickness t that is equal to or slightly greater than the major diameter d, a width w that is preferably at least approximately double the major diameter d, and a length l between the handles 16 and the body portion 24. Preferably the length l is sufficient for locating extremities of successive layers of the edible 11 thereon as described below for facilitating controlled application of the successive layers. The sucker 10 as discussed above in connection with FIGS. 5-10 is preferably formed with the diameter D on the order of 1.5 inches, the major diameter d being from about 0.125 inch to about 0.2 inch, more preferably from about 0.15 inch to about 0.19 inch.

With further reference to FIGS. 11 and 12, in another preferred configuration of the sucker 10, the edible 11 is supported on a molded stick 28, the stick 28 having one of the looped handles 16, the handles 16 being rigidly connected to a counterpart of the ring-shaped body portion 24 by the coupling member 22. As shown in FIGS. 11 and 12, the edible 11 can be disc-shaped, having an outside diameter D and a thickness T. For example, the diameter D can be approximately 1.5 inches, and the thickness T can be approximately 0.75 inch. In this configuration, the edible 11 of the sucker 10 can be safely consumed without danger of premature swallowing of the edible 11 in that the body portion 24 is too large to be swallowed under ordinary circumstances. For this purpose, the body portion 24 is formed with an outside diameter $D_B$ of at least approximately 1.0 inch. The edible 11 is securely bonded to the stick 28, both surrounding and protruding the body portion 24. The non-circular cross-sectional configuration of the body portion 24 (including the lobes 18) effectively retains the edible 11 in place on the body portion 24 as discussed above, even when so much of the edible 11 is dissolved away that the body portion 24 is exposed. Even in the unlikely event that the edible 11 were to enter the throat of a consumer, removal thereof can be quickly effected by merely hooking on to a trailing portion of the handles 16. Moreover, the smoothly curved body axis 25 guards against injury to exposed mouth tissue of the consumer.

With further reference to FIGS. 13 and 14, a first edible layer 32 can be molded onto the body portion 24, the first edible layer 32 being shaped for simulating a prototype object such as a cartoon character 34. In further accordance with the present invention, a second edible layer 36 covers the first edible layer 32, the second edible 36 being formed of a transparent or semi-transparent material for permitting the first edible layer 32 to be viewed through the second edible layer 36. Bonding of the second edible layer 36 to the first edible layer 32 is facilitated by similarities in the materials of the respective layers 32 and 36. Preferably the first edible layer 32 and the second edible layer 36 have similar mechanical properties and solubility, such that the first edible layer 32 begins to be consumed along with the second edible layer 36 when portions of the second edible layer 36 become completely consumed. Further, the second edible layer 36 completely encloses the first edible layer 32, promoting the structural integrity of the second edible 36. Moreover, as the second edible 36 is consumed, exposing portions of the first edible layer 32, the first edible layer 32 begins itself to be consumed, such that a smooth contour of the resulting envelope is maintained, such that the remaining portions of the second edible layer 36 are not likely to be subjected to significant loads tending to separate the second edible layer 36 from the first edible layer 32. As further shown in FIGS. 13 and 14, the second edible layer 36 is molded about the first edible layer 32 and portions of the coupling member 22, the outer contour of the second edible layer 36 being substantially independent of the contour of the first edible layer 32, thereby forming a wholly one-piece solidified edible.

With further reference to FIG. 15, the body portion 24 itself can be shaped for simulating a prototype object (such as a cartoon character). In the configuration of FIG. 15, the second edible layer 36 has a substantially uniform thickness $T_2$ for facilitating application of the second edible layer 36 such as by dipping.

With further reference to FIG. 16, the edible 11 can be shaped for simulating a vehicle 38 such as a space vehicle. The body portion 24 of the stick 28 is similarly configured. As shown in FIG. 16, the first edible layer 32 is omitted for permitting direct view of the support member 24 through a counterpart of the second layer 36, designated transparent layer 40.

It is the applicant's intent that each of the just-described throat-soothing edibles on a stick, the edible 11 on sticks 13, 14, and 15, will be distributed for consumption to all groups in the general population.

In the configuration of the invention shown as FIGS. 1-6 wherein the edible 11 is securely molded at the centers of the sticks 13, 14, and 15 for effectively creating two symmetrical handles 16, the handles 16 are to be grasped by the consumer, one in each hand, while the edible 11 is being consumed. The length L from the center of the edible 11 to the end of each handle 16 is preferably at least double an axial length of the edible 11 (equivalent to the diameter D in the above-described spherical configuration of the edible 11), this length of each handle 16 advantageously preventing consumption of the edible 11 with one of the handles 16 entering the mouth.

In operation, the articles of in FIGS. 1-4 are picked up with either one or two hands on the stick 13 (14) and conveyed to the mouth. Then, after grasping both handles (one in each hand) of the stick 13 (14), usually with the thumb and forefinger, the consumer slowly licks and sucks the edible 11 which is only partially placed in the mouth. As noted above, the two symmetrical handles also serve as a protective barrier for preventing the edible 11 from entering the mouth. While the edible 11 is being consumed, the sucker 10 composed of the edible 11 and the stick 13 (14), is being moved away from and back towards the mouth intermittently. This process continues until there is only a small piece(s) of the edible 11 remaining on the stick 13 (14). At this point, the consumer will normally discard the stick 13 (14).

The mode of operation for the sucker 10 of FIGS. 5-10, which having the looped handle 16 on either side of the edible 11 on the stick 15, is virtually the same as that just described for the sucker 10 of in FIGS. 1-4. The basic difference is that the handles 16 on the stick 15 are even easier to hold, i.e., the consumer can grasp the looped handles 16 on the stick 15 by curling his fingers around them (the handles 16).

The edible 11 can be molded on the sticks 13, 14, 15, and 28 according to the following steps:
 (a) heating ingredients for the edible 11 to a moldable semi-plastic consistency;
 (b) injection-molding the edible 11 onto the centers of sticks 13, 14, 15, and 28;

(c) shaping the edible 11 onto the sticks 13, 14, 15, and 28 where required; and (d) cooling the edible 11 to the temperature necessary and for the time required for solidifying the edible 11 onto the sticks 13, 14, 15, and 28.

In the configuration of FIGS. 13-15, the molded edible can be a first edible layer, the method includes the further steps of:

(a) heating similar ingredients for the edible 11 to a moldable semi-plastic consistency, the similar ingredients providing a transparent or semi-transparent material when cooled;

(a) injection-molding the similar ingredients for forming a second layer of edible material onto the first edible layer on the stick 28 (or on the stick 13, 14, or 15).

Although the present invention has been described in considerable detail with reference to certain preferred versions thereof, other versions are possible. For example, the edible 11 can be of any size, shape, color, and/or flavor. The plastic handle can also be any size or shape. The transparent overlayment edible can be any flavor, size, shape or thickness, as well as colored. Further, the edible can be formed such that one side is molded in a shape, such as a face, and the other side can be a different color. Therefore, the spirit and scope of the appended claims should not necessarily be limited to the description of the preferred versions contained herein.

What is claimed is:

1. A sucker comprising:
   (a) a support member formed from a semi-rigid plastic material and having:
      (i) a rod-shaped support body portion having substantially uniform cross-section along a curved body axis and forming a closed support loop having a lateral dimension of the loop sufficiently large for resisting accidental swallowing by a consumer of the sucker;
      (ii) a rod-shaped handle portion having substantially uniform cross-section along a curved handle axis between end extremities thereof and forming a closed loop, the semi-rigid material of the handle portion permitting the handle portion to be deformed when grasped, but resilient enough to return to its initial configuration when it is released; and
      (iii) a coupling poriton fixably connecting the end extremities of the handle portion for forming the closed, elongate handle loop, the coupling portion connecting the handle portion in spaced relation to the body portion; and
   (b) a dissolvable edible material completely enclosing the body portion with the closed loop configuration of the body portion providing positive interlocking engagement of the edible material thereon, the handle loop extending from proximate the edible material, the edible material not contacting the handle portion.

2. The sucker of claim 1, wherein the body portion is shaped for simulating a prototype object.

3. The sucker of claim 2, wherein the prototype object is a cartoon character.

4. The sucker of claim 2, wherein the prototype object is a vehicle.

5. The sucker of claim 1, wherein the body axis is shaped for simulting a prototype object.

6. The sucker of claim 5, wherein the body axis is located in a viewing plane, the body axis being approximately uniformly spaced from an outside contour of the edible in the viewing plane, the outside contour of the edible in the viewing plane, the outside contour forming an enlarged counterpart of the simulated prototype object.

7. The sucker of claim 1, wherein the body portion is formed with a solid cross-sectional shape having at least one lobe, the lobe forming a helical pattern shape simulative of a rope along the body axis for enhancing support of the edible material on the body portion.

8. The sucker of claim 7, wherein the body portion is formed with a pair of the lobes, the lobes being symmetrically spaced about the body axis and having a helix angle of approximately 45°.

9. The sucker of claim 7, wherein the handle portion is formed with a uniform solid cross-sectional shape having at least one lobe, the lobe forming a helical pattern shape simulative of a rope along the handle axis for imparting flexibility to the handle portion and for enhancing support of the handle poriton by the hand of an eater of the edible material.

10. The sucker of claim 1, wherein the coupling portion substantially enclosed in the edible material symmetrically spaced about the body axis and having a helix angle of approximately 45°.

11. The sucker of claim 1, wherein the coupling portion has a coupling axis extending between the support body portion and the handle portion, the coupling portion having a substantially uniform cross-section along the coupling axis.

12. The sucker of claim 11, wherein the coupling portion is substantially rectangular in cross section, having a thickness approximately equal to a corresponding cross-sectional thickness of the handle portion, and a width, the width being at least approximately double the thickness for supportively connecting the end extremities of the handle portion in adjacent relation.

13. The sucker of claim 1, wherein the edible material comprises:
   (a) a first edible layer, the first edible layer being shaped for simulating a prototype object; and
   (b) a second edible layer contacting the first edible layer, the second edible layer being at least semi-transparent for permitting view of the first edible layer through the second edible layer.

14. The sucker of claim 13, wherein the second edible layer has an approximatley uniform thickness in at least one viewing plane for forming an enlarged counterpart of the simulated prototype object.

15. The sucker of claim 14, wherein the thickness of the second edible layer in the viewing plane is at least approximately 10 percent of the corresponding thickness of the first edible layer.

16. The sucker of claim 14, wherein the thickness of the second edible layer is substantially uniform in at least two intersecting planes.

17. The sucker of claim 13, wherein the second edible layer is molded onto the first edible layer, the outside shape of the second edible layer being independent of the shape of the first edible layer.

18. The sucker of claim 13, wherein the second edible layer encloses the first edible layer.

19. The sucker of claim 1, wherein the handle portion is formed with a uniform solid cross-sectional shape having at least one lobe, the lobe forming a helical pattern shape simultive of a rope along the handle axis for imparting flexibility to the handle portion and for enhancing support of the handle portion by the hand of an eater of the edible material.

20. The sucker of claim 19, wherein the handle portion is formed with a pair of the lobes, the lobes being symmetrically spaced about the handle axis and having a helix angle of approximately 45°.

21. The sucker of claim 19, wherein the support member comprises a material selected from the group consisting of polyethtylene, polypropylene, and nylon, the handle portion having a major cross-sectional diameter of between approximately 0.125 inch and approximately 0.2 inch.

22. The sucker of claim 21, wherein the cross-sectional diameter is between approximately 0.15 inch and 0.19 inch.

23. The sucker of claim 1, wherein the handle portion is a first handle portion, the support member also forming a second rod-shaped, closed loop handle portion, and wherein the support member further includes a second coupling portion fixably connecting the second handle portion to the body portion, the handle portions each extending from opposite sides of the body portion by a distance in excess of an axial length of the edible for preventing swallowing of the edible in an undissolved condition.

24. The sucker of claim 1, wherein the lateral dimension of the body portion is at least approximately 1.0 inch.

25. The sucker of claim 24, wherein the body poriton is sufficiently large to enclose a circle having a diameter of approximatley 1.0 inch for enhanced resistance to the accidental swallowing.

* * * * *